United States Patent Office 2,757,155
Patented July 31, 1956

2,757,155

STABILIZED CHLOROSULFONATED HYDROCARBON POLYMER COMPOSITIONS

Ralph H. Sudekum, Wilmington, Del., assignor to E. I. du Pont de Nemours and Company, Wilmington, Del., a corporation of Delaware No Drawing. Application April 14, 1953,
Serial No. 348,807

15 Claims. (Cl. 260—30.4)

This invention relates to coating compositions, to processes for their preparation and more particularly to such coating compositions containing flocculated metals.

The halosulfonated hydrocarbon polymers used in the coating compositions of this invention may be produced by any suitable process, such as that disclosed in the McQueen U. S. Patent 2,212,786, issued August 27, 1940. By the process of the patent olefin polymers, such as the solid ethylene polymers, are chlorosulfonated by a reaction with chlorine or other halogen and sulfur dioxide. It is known that these halosulfonated hydrocarbon polymers can be vulcanized or cured (hereinafter this process will be referred to as curing) by treating the polymer with a so-called cross-linking agent, preferably in the presence of compounding agents. Suitable curing recipes are disclosed in the issued U. S. patents of McAlevy et al., 2,416,060 and 2,416,061, issued February 18, 1947. Prior to curing, the halosulfonated hydrocarbon polymers have many valuable properties. After curing, their physical and chemical resistances are enhanced appreciably. Toughness, abrasion resistance and resistance to many chemicals are greatly improved by such treatment.

Inasmuch as one of the fundamentally important properties of a coating composition is its resistance to physical or chemical attack, the preparation of such compositions, based on halosulfonated hydrocarbon polymers, demands for optimum utility that the coatings therefrom should contain the cured rather than the uncured polymer. The cured halosulfonated hydrocarbon polymers, however, are not soluble in any organic or inorganic solvent. Coating compositions from these polymers, accordingly, are generally prepared from the uncured composition which is cured after application to the surfaces being coated. Due to the elastomeric properties of the chlorosulfonated hydrocarbon polymers, they are adaptable for use in coating synthetic and natural elastomers such as rubber, rubber-like polymers of 2-chloro-1,3-butadiene known as neoprene, copolymers of 1,3-butadiene with acrylonitrile, copolymers of 1,3-butadiene with styrene and the like polymeric and copolymeric compositions. When applied to such surfaces, however, migration of compounding agents or other constituents present in the substrate into the coated film often results in mottled surface effects, discoloration and the like.

An object of the present invention is to provide stabilized coating compositions containing halosulfonated hydrocarbon polymers. Another object of the invention is to provide paints, varnishes, enamels, lacquers and the like containing chlorosulfonated normally solid polymers of ethylene and flocculated metals. A further object is to provide stable coating compositions containing halosulfonated hydrocarbon polymers in the uncured state that resist discoloration. A further object is to provide adjuvants for use in such coating compositions. Yet another object is to provide coating compositions containing halosulfonated hydrocarbon polymers and flaked metal powder that resist discoloration when coated onto elastomers containing staining materials. Other objects and advantages of the invention will hereinafter appear.

In accord with one feature of the invention, a coating composition is prepared by forming a solution of uncured halosulfonated hydrocarbon polymer in a suitable solvent, dispersing a flocculated metal therein together with compounding agents forming a homogeneous mixture of the solution in dispersion and thereafter and within a comparatively short period of time putting the composition to its functional use. The coating composition thus prepared is especially well adapted for use with natural and synthetic elastomers that contain substances tending to stain the coating compositions. It has been found that there are a number of compounding ingredients present in elastomers that are responsible for staining unprotected coatings. Most objectionable are the antioxidants which migrate through the coating and then are oxidized by air to give a brown unsightly stain to the surface of the coated layer. Plasticizers of various types likewise tend to migrate through unprotected coating compositions. When, however, the halosulfonated hydrocarbon polymer coating compositions are prepared in accord with the invention and contain a flocculated metal, these compositions, when applied to elastomers containing staining agents, prevent those agents from penetrating into the coating and result in a coated product retaining the color of the coating as initially applied.

Another feature of the invention is to prepare such a coating composition that contains anti-gelling agents, which agents inhibit the curing of the halosulfonated hydrocarbon polymer while in the solution. The coating composition thus prepared can be stored prior to use for extended periods of time without gelation of the substituted polymer. When the coating composition is spread out as a film the solvent present evaporates, the effectiveness of the anti-gelling agent is lost and the substituted hydrocarbon polymer in the film then reacts chemically with the curing agent present to form a cured polymer. The order of mixing the solvent, anti-gelling agent, flocculated metal, curing and compounding agents with the halosulfonated hydrocarbon polymer is not material although care should be exercised that this addition be made in such a manner that there is no appreciable gelling of the polymer during the preparation of the composition.

Alternatively, compositions effective for use as paints, lacquers and the like can be prepared by forming a dispersion of the halosulfonated hydrocarbon polymer and flocculated metal in the presence or absence of a gelling inhibitor. This dispersion may contain curing and other compounding agents much in the same manner as the solution described above. Dispersions of this nature lay down a thicker and heavier coating of the polymer film in one application with considerable saving in time and labor. The preferred dispersion of this nature is formed in a non-solvent for the polymer which, however, is capable of swelling the polymer. Suitable liquids for the continuous phase of such dispersions in which the polymers are swollen include methyl ethyl ketone, dioxane and diisobutyl ketone. The vehicle for extending the halosulfonated hydrocarbon polymer, a non-solvent hydrocarbon having low aromatic content, is selected principally to facilitate the application of the film as a coating composition by brush or spreading device, or as a dispersion by doctor knife or extrusion device or by any other suitable method.

The examples which follow illustrate embodiments of the invention in which parts are by weight unless otherwise indicated.

TABLE

*Paints*

|  | Example 1 | Example 2 | Example 3 | Example 4 | Example 5 | Example 6 | Example 7 |
|---|---|---|---|---|---|---|---|
| Chlorosulfonated polyethylene | 100 | 100 | 100 | 100 | 100 | 100 | 100. |
| Tribasic lead maleate | 20 | 20 | 40 | 40 | 40 |  | 40. |
| Litharge |  |  |  |  |  | 30 |  |
| Mercaptobenzothiazole | 1 | 1 | 2 | 2 | 2 | 2 | 2. |
| $TiO_2$ | 75 |  |  |  |  |  |  |
| Hydrogenated wood rosin | 12 | 2.5 | 5 | 5 | 5 | 5 | 5. |
| Aluminum powder— |  |  |  |  |  |  |  |
| 325 mesh |  | 50 | 25 | 25 | 25 | 25 | 25. |
| 100 mesh |  |  |  |  |  |  |  |
| Toluene | 400 | 400 | 400 | 400 | 400 | 400 | 400. |
| Xylene |  |  | 50 |  |  |  |  |
| Isopropanol |  | 100 | 50 | 100 | 100 | 100 | 100. |
| Butanol |  |  |  | 2 | 2 | 2 | 2. |
| Adipic acid |  | 2 | 2 | 97.5 | 52.5 | 240.0 | 52.5. |
| Mineral spirits |  |  |  | 30 |  | 20 |  |
| Chrome yellow |  |  |  | 10 | 10 | 10 | 10. |
| Monastral blue |  |  |  |  |  | 50 |  |
| Para-coumarone-indene resin Melting Range 115–125° C. |  |  |  |  |  | 50 |  |
| Precipitated calcium carbonate |  |  |  |  |  | 1 |  |
| Aluminum stearate |  |  |  |  |  |  | 10. |
| Beta-oxy naphthoic type red |  |  |  |  |  |  | 25.0. |
| Percent Solids | 27.0 | 25.9 | 25.8 | 26.4 | 25.0 | 28.5 | 25.0. |
| Color | White | Aluminum | Aluminum | Light Green | Light Blue | Light Green | Red. |

When applied to a vulcanized rubber surface containing staining materials, the paint of Example 1 has a satisfactory covering power and a white color. As the paint dries and as the uncured chlorosulfonated polyethylene begins to cure, discoloration occurs so that when the paint is completely dry it has turned light yellow and will turn brown in a few hours on exposure to the sunlight. In contrast to the coating composition of Example 1, Examples 2 to 7 provide colored coating compositions which, because of the presence of the flocculated aluminum, retain their original color after curing, with essentially no discoloration taking place after 9 months indoors. Larger amounts of colorants than are described in the examples can be used to give pleasing pastel shades. Darker colors may also be obtained by decreasing the amounts of aluminum powder or aluminum flakes of relatively large particle size.

Dispersions of the chlorosulfonated hydrocarbon polymers are also contemplated by the invention. They can be prepared in any suitable manner. The following example illustrates a stain-resistant coating composition prepared from a dispersion of a chlorosulfonated normally solid polymer of ethylene.

*Example 8.*—Into a high speed mixer, such as a Waring blender, 100 parts of a normally solid chlorosulfonated polymer of ethylene, 60 parts of methyl ethyl ketone and 76 parts of V. M. & P. naptha were blended until a homogeneous mixture was obtained. Another blended mixture was made by ball milling for a period of about 24 hours a mixture containing 100 parts of butyl alcohol, 2 parts of adipic acid, 40 parts of tribasic lead maleate, 2 parts of mercaptobenzothiazole, 5 parts of hydrogenated wood rosin and 25 parts of aluminum powder. The ball milled composition was added to the homogenized mixture from the Waring blender and the combined mixtures blended to a smooth, well dispersed composition. When this dispersed coating composition was applied to a rubber surface, which rubber stained similar coating compositions containing no aluminum powder, the coated product retained its initial aluminum color without any detectable change in visual appearance over an extended period of time.

The curing systems that are used in the above coating compositions are those generally known to be satisfactory for the preparation of the solid halosulfonated hydrocarbon compounds. The recipes of the above patents are satisfactory although other suitable curing systems may be used. Various types of lead compounds may be used, such as litharge, basic lead carbonate and commercially named products containing such compositions as tribasic lead maleate and dibasic lead phthalate sold under various trade names. Magnesium oxide, polyoximes and the organic curing systems of the pending McAlevy U. S. application S. N. 289,677, filed May 23, 1952, may be used wherein the substituted polymers are cured by formation of sulfonamido groups with such compounds as the aliphatic and aromatic amides, amine, hydroxyl, and mercapto-containing compounds. Tribasic lead maleate is one of the preferred curing agents as it gives compositions that can be made in any color and the coating composition has good shelf-life while the films formed from such compositions have good weathering properties and are highly water insensitive. Litharge and the organic polyoximes, on the other hand, are used principally for compositions in which darker colors are desired. The quantity of the curing agents used in the coating compositions can be varied over a wide range, depending on the properties desired in the product. The preferred range for the lead compounds is between 20 and 40 parts per 100 parts of the polymer used.

Certain compounds prevent the formation of gels in the coating compositions or dispersions and are herein called anti-gelling agents and are disclosed in my copending application Serial No. 338,611 filed February 24, 1953. The monohydric aliphatic alcohols are especially effective for this purpose as are also certain organic acids. The alcohols that are used include, for example, propyl and butyl alcohols. The organic acids particularly suitable for use as anti-gelling agents include phthalic and adipic acids and anhydrides thereof. These acids and anhydrides per se inhibit gelling of the solutions but they do not prevent the solid films from being cured. While both alcohols and acids by themselves retard gelling, the combination of acid with alcohol gives a synergistic improvement, there being present from 50 to 100 parts of the alcohol per 100 parts of the hydrocarbon polymer and from 1 to 2 parts of acidic compound. The upper limit of the alcohol is determined primarily by the solubility tolerance of the solution for that alcohol. No more alcohol should be employed than will dissolve in the hydrocarbon solvent. The limits of the acidic compound that may be present as an anti-gelling agent range from 1 up to about 5 parts per 100 parts of the hydrocarbon polymer solution.

It is believed that the flocculated metals because of their leafing power when spread out in the coating composition as a film, overlap and by overlapping prevent the migration of substances in the substrate covered from penetrating into the coated film. The solvent used in preparing the coating composition and the dispersant used in preparing dispersions described above tend to dissolve superficially the surfaces of natural and synthetic elastomers, possibly thereby rendering constituents contained in those substrates more mobile. Due to this higher degree of mobility it is believed that the substances are freer to migrate and do migrate into the coating films even after the film is dry and cured unless those films are loaded with a suitable amount of a flocculated metal. It has been found that the coating compositions should contain from 10 to 100 parts of flocculated metal per 100 parts of the chlorosulfonated hydrocarbon polymer and for preferred usage between 25 and 50 parts of the flocculated metal per 100 parts of that polymer. The preferred flocculated metal is aluminum, primarily because of its present ready availability and because of the high degree of leafing and small particle size provided by the flocculated aluminum produced at the present time. Other flocculated metals may be employed, however, such as copper, copper alloys and zinc.

Any suitable solvent for the uncured hydrocarbon polymer may be used but the aromatic hydrocarbons falling in the boiling range between toluene and xylene are preferred because they give compositions which dry at approximately the proper rate and are comparatively non-toxic. If the coating composition is to be non-flammable, chlorinated hydrocarbons such as carbon tetrachloride and the other halogenated hydrocarbons are used. The composition containing 20% of a chlorosulfonated polymer of ethylene in toluene is a preferred composition although solutions ranging up to 25% on the same basis can be employed. Such solutions of the halosulfonated polymers of ethylene have a high tolerance for alkyl substituted hydrocarbons so that pigmented dipersions in such hydrocarbons as naptha and mineral spirits can be used. Esters such as isobutyl acetate, isopropyl acetate and methyl amyl acetate, and ketones such as methyl ethyl ketone, diisobutyl ketone and methyl isobutyl ketone, and alcohols such as n-butyl alcohol, isobutyl alcohol, and isopropyl alcohol can also be employed in pigmented dispersions.

Many of the known accelerators for curing halosulfonated elastomers may be employed, such, for example, as mercaptobenzothiazole, benzothiazyl disulfide and the like. These and their equivalents are used in amounts ranging between 1 to 3 parts per 100 parts of the halosulfonated hydrocarbons, such accelerators being added to those compositions that are to be dried and the sulfonated hydrocarbon polymer content cured at temperatures between 125° C. and 160° C. Superaccelerators may likewise be employed, such, for example as DPG (diphenylguanidine), sodium acetate, pyridine and morpholine. These superaccelerators permit the preparation of coating compositions, paints and the like that will cure at room temperatures. DPG is exceptionally well adapted for this use and should be present in amounts ranging from 0.1 to 2 parts per 100 parts of the hydrocarbon polymer solution. The other superaccelerators may likewise be employed in substantially the same proportions.

In addition to other adjuvants, such, for example, as fillers, coloring agents and dispersing agents, fire-proofing agents may be employed. Especially effective for the latter purpose is antimony trioxide. Antimony trioxide renders the chlorosulfonated hydrocarbon polymers fire-resistant when present to the extent of at least 10 parts of the trioxide per 100 parts of the chlorosulfonated polymer of ethylene or other hydrocarbon polymer when coated on flammable fabrics or fiber glass. By increasing the amount of antimony trioxide to about 50 parts per 100 parts of the hydrocarbon polymer, the fire resistance is increased to such an extent that an unsupported film of such a composition will not support combustion. Above 50 parts per 100 of the hydrocarbon polymer, the antimony trioxide appears to act merely as a filler. The preferred range, accordingly, is between 10 and 50 parts of the oxide per 100 parts of the hydrocarbon polymer for fire-resistant unsupported films.

Coating compositions can be prepared in accord with the process of this invention to provide white, blue, black or any desired coating. These compositions are particularly useful for the coating of a substrate which is subject to flexing, such as rubber, rubber coated fabrics, tire stock and the like materials of synthetic and natural rubber. These coating compositions show good adhesion to such fabrics and also to natural and synthetic elastomers, particularly if the latter are slightly buffed before being coated with the compositions herein described.

The coating compositions may be applied to the surface of cured natural or synthetic elastomers and the halosulfonated hydrocarbon polymer therein cured in the manner described above or, contrariwise, the coating composition may be applied to the uncured natural and synthetic elastomers such as rubber, rubber-like polymers of 2-chloro-1,3-butadiene known as neoprene, copolymers of 1,3-butadiene with acrylonitrile, copolymers of 1,3-butadiene with styrene and like polymeric or copolymeric compositions and the evaporation of the solvent and/or curing of the chlorosulfonated hydrocarbon polymer being accomplished simultaneously with the curing of the elastomers in a press, mold or similar device.

I claim:

1. A liquid composition comprising a homogeneous mixture of an uncured halosulfonated polymer of ethylene in an inert organic liquid which is a member of the class consisting of solvents for the polymer and non-solvents for the polymer which are capable of swelling the polymer, compounding agents for curing the polymer, and from 10 to 100 parts for each 100 parts of the polymer of a flocculated metal of the class consisting of aluminum, copper, copper alloys and zinc.

2. A liquid composition comprising a homogeneous mixture of an uncured halosulfonated polymer of ethylene in an inert organic liquid which is a member of the class consisting of solvents for the polymer and non-solvents for the polymer which are capable of swelling the polymer, compounding agents for curing the polymer, from 10 to 100 parts for each 100 parts of the polymer of a flocculated metal of the class consisting of aluminum, copper, copper alloys and zinc, and at least one anti-gelling agent of the class consisting of monohydric aliphatic alcohols, adipic acid, phthalic acid and the anhydrides of adipic and phthalic acids in amounts sufficient to prevent gelling of the polymer in said organic liquid.

3. A liquid composition comprising a homogeneous mixture of an uncured halosulfonated polymer of ethylene in an inert organic liquid which is a member of the class consisting of solvents for the polymer and non-solvents for the polymer which are capable of swelling the polymer, compounding agents for curing the polymer, from 10 to 100 parts for each 100 parts of the polymer of a flocculated metal of the class consisting of aluminum, copper, copper alloys and zinc, and from about 50 to about 100 parts of a monohydric aliphatic alcohol for each 100 parts of the polymer.

4. A liquid composition comprising a homogeneous mixture of an uncured chlorosulfonated polymer of ethylene in an inert organic liquid which is a member of the class consisting of solvents for the polymer and non-solvents for the polymer which are capable of swelling the polymer, compounding agents for curing the polymer, and from 10 to 100 parts for each 100 parts of the polymer of a flocculated metal of the class consisting of aluminum, copper, copper alloys and zinc.

5. A liquid composition comprising a homogeneous mixture of an uncured chlorosulfonated polymer of ethylene in an inert organic liquid which is a member of the class consisting of solvents for the polymer and non-solvents for the polymer which are capable of swelling the polymer, compounding agents for curing the polymer, and from 10 to 100 parts of aluminum powder for each 100 parts of the polymer.

6. A liquid composition comprising a homogeneous mixture of an uncured chlorosulfonated polymer of ethylene in an inert organic liquid which is a member of the class consisting of solvents for the polymer and non-solvents for the polymer which are capable of swelling the polymer, compounding agents for curing the polymer, from 10 to 100 parts for each 100 parts of the polymer of a flocculated metal of the class consisting of aluminum, copper, copper alloys and zinc, and at least one anti-gelling agent of the class consisting of monohydric aliphatic alcohols, adipic acid, phthalic acid and the anhydrides of adipic and phthalic acids in amounts sufficient to prevent gelling of the polymer in said organic liquid.

7. A liquid composition comprising a homogeneous mixture of an uncured chlorosulfonated polymer of ethylene in an inert organic liquid which is a member of the class consisting of solvents for the polymer and non-solvents for the polymer which are capable of swelling the polymer, compounding agents for curing the polymer, from 10 to 100 parts of aluminum powder for each 100 parts of the polymer, and at least one anti-gelling agent of the class consisting of monohydric aliphatic alcohols, adipic acid, phthalic acid and the anhydrides of adipic and phthalic acids in amounts sufficient to prevent gelling of the polymer in said organic liquid.

8. A liquid composition comprising a homogeneous mixture of an uncured chlorosulfonated polymer of ethylene in an inert organic liquid which is a member of the class consisting of solvents for the polymer and non-solvents for the polymer which are capable of swelling the polymer, compounding agents for curing the polymer, from about 25 to about 50 parts of aluminum powder for each 100 parts of the polymer, and at least one anti-gelling agent of the class consisting of monohydric aliphatic alcohols, adipic acid, phthalic acid and the anhydrides of adipic and phthalic acids in amounts sufficient to prevent gelling of the polymer in said organic liquid.

9. A liquid composition comprising a homogeneous mixture of an uncured chlorosulfonated polymer of ethylene in an inert organic liquid solvent for the polymer, compounding agents for curing the polymer, from 10 to 100 parts of aluminum powder for each 100 parts of the polymer, and at least one anti-gelling agent of the class consisting of monohydric aliphatic alcohols, adipic acid, phthalic acid and the anhydrides of adipic and phthalic acids in amounts sufficient to prevent gelling of the polymer in said solvent.

10. A liquid composition comprising a homogeneous mixture of an uncured chlorosulfonated polymer of ethylene in an inert organic liquid solvent for the polymer, compounding agents for curing the polymer, from about 25 to about 50 parts of aluminum powder for each 100 parts of the polymer, and at least one anti-gelling agent of the class consisting of monohydric aliphatic alcohols, adipic acid, phthalic acid and the anhydrides of adipic and phthalic acids in amounts sufficient to prevent gelling of the polymer in said organic liquid.

11. A liquid composition comprising a homogeneous mixture of an uncured chlorosulfonated polymer of ethylene in an inert organic liquid which is a member of the class consisting of solvents for the polymer and non-solvents for the polymer which are capable of swelling the polymer, compounding agents for curing the polymer, from 10 to 100 parts of aluminum powder for each 100 parts of the polymer, from about 50 to about 100 parts of a monohydric aliphatic alcohol for each 100 parts of the polymer, and from about 1 to about 5 parts for each 100 parts of the polymer of a member of the group consisting of adipic acid, phthalic acid and the anhydrides of adipic and phthalic acids.

12. A liquid composition comprising a homogeneous mixture of an uncured chlorosulfonated polymer of ethylene in an inert organic liquid which is a member of the class consisting of solvents for the polymer and non-solvents for the polymer which are capable of swelling the polymer, compounding agents for curing the polymer, from 10 to 100 parts of aluminum powder for each 100 parts of the polymer, at least one anti-gelling agent of the class consisting of monohydric aliphatic alcohols, adipic acid, phthalic acid and the anhydrides of adipic and phthalic acids in amounts sufficient to prevent gelling of the polymer in said organic liquid, and from about 10 to about 50 parts of antimony trioxide for each 100 parts of the polymer.

13. A coated flexible material comprising a substrate of an elastomer of the group consisting of synthetic and natural rubbers capable of staining compositions coated thereon, said substrate being coated with a composition containing a cured halosulfonated polymer of ethylene and from 10 to 100 parts for each 100 parts of said polymer of a flocculated metal of the class consisting of aluminum, copper, copper alloys and zinc.

14. A coated flexible material comprising a substrate of an elastomer of the group consisting of synthetic and natural rubbers capable of staining compositions coated thereon, said substrate being coated with a composition containing a cured chlorosulfonated polymer of ethylene and from 10 to 100 parts of powdered aluminum for each 100 parts of said polymer.

15. A coated flexible material comprising a substrate of an elastomer of the group consisting of synthetic and natural rubbers capable of staining compositions coated thereon, said substrate being coated with a composition containing a cured chlorosulfonated polymer of ethylene and from about 25 to about 50 parts of powdered aluminum for each 100 parts of said polymer.

References Cited in the file of this patent

UNITED STATES PATENTS 2,455,854     Conde                 Dec. 7, 1948